(12) United States Patent
Carranza et al.

(10) Patent No.: US 11,017,539 B2
(45) Date of Patent: May 25, 2021

(54) OBJECT TRACKING AND IDENTIFICATION USING INTELLIGENT CAMERA ORCHESTRATION

(71) Applicant: Intel Corporation, Santa Clara, CA (US)

(72) Inventors: Marcos Emanuel Carranza, Portland, OR (US); Lakshmi N. Talluru, Chandler, AZ (US); Cesar I. Martinez Spessot, Hillsboro, OR (US); Mateo Guzman, Hillsboro, OR (US); Sebastian M. Salomon, North Plains, OR (US); Mats G. Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 15/966,788

(22) Filed: Apr. 30, 2018

(65) Prior Publication Data

US 2019/0043207 A1 Feb. 7, 2019

(51) Int. Cl.
*G06K 9/00* (2006.01)
*G06T 7/292* (2017.01)
*G06K 9/32* (2006.01)
*G06T 7/50* (2017.01)
*G06K 9/20* (2006.01)

(52) U.S. Cl.
CPC .......... *G06T 7/292* (2017.01); *G06K 9/00228* (2013.01); *G06K 9/00288* (2013.01); *G06K 9/00771* (2013.01); *G06K 9/325* (2013.01); *G06T 7/50* (2017.01); *G06K 2009/2045* (2013.01); *G06K 2209/27* (2013.01); *G06T 2207/10016* (2013.01);
(Continued)

(58) Field of Classification Search
CPC . G06T 7/292; G06T 7/50; G06T 2207/10016; G06T 2207/30196; G06T 2207/30232; G06T 2207/30241; G06K 9/00228; G06K 9/00288; G06K 9/00771; G06K 9/325; G06K 2009/2045; G06K 2209/27
See application file for complete search history.

(56) References Cited

U.S. PATENT DOCUMENTS 8,417,035 B2 * 4/2013 Angell .................. G06F 16/70
382/181
10,289,966 B2 * 5/2019 Daher .................. G06Q 10/02
(Continued)

*Primary Examiner* — Shefali D Goradia
(74) *Attorney, Agent, or Firm* — Alliance IP, LLC

(57) ABSTRACT

In one embodiment, an apparatus comprises a communication interface and a processor. The communication interface is to communicate with a plurality of cameras. The processor is to obtain metadata associated with an initial state of an object, wherein the object is captured by a first camera in a first video stream at a first point in time, and wherein the metadata is obtained based on the first video stream. The processor is further to predict, based on the metadata, a future state of the object at a second point in time, and identify a second camera for capturing the object at the second point in time. The processor is further to configure the second camera to capture the object in a second video stream at the second point in time, wherein the second camera is configured to capture the object based on the future state of the object.

25 Claims, 13 Drawing Sheets

(52) U.S. Cl.
  CPC .............. *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 10,479,647 | B2* | 11/2019 | Hsu | B66B 1/2408 |
| 10,510,157 | B2* | 12/2019 | Seyfi | G06K 9/00228 |
| 10,825,479 | B2* | 11/2020 | Hershfield | G06F 16/7867 |
| 2018/0018508 | A1* | 1/2018 | Tusch | G06K 9/00771 |

* cited by examiner

US 11,017,539 B2

OBJECT TRACKING AND IDENTIFICATION USING INTELLIGENT CAMERA ORCHESTRATION

FIELD OF THE SPECIFICATION

This disclosure relates in general to the field of visual computing, and more particularly, though not exclusively, to object tracking and identification using intelligent camera orchestration.

BACKGROUND

Advancements in modern computing and computer vision technology, along with rapid deployments of cameras and other vision sensors, have led to an increased use of visual computing for a variety of mainstream applications and use cases. Further, many visual computing applications leverage some form of object tracking and identification, which may involve tracking and/or identifying an object across multiple camera views. Existing solutions for tracking and identifying objects across multiple camera views, however, suffer from various limitations, including low accuracy, high complexity, and inefficient resource utilization, among other examples.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
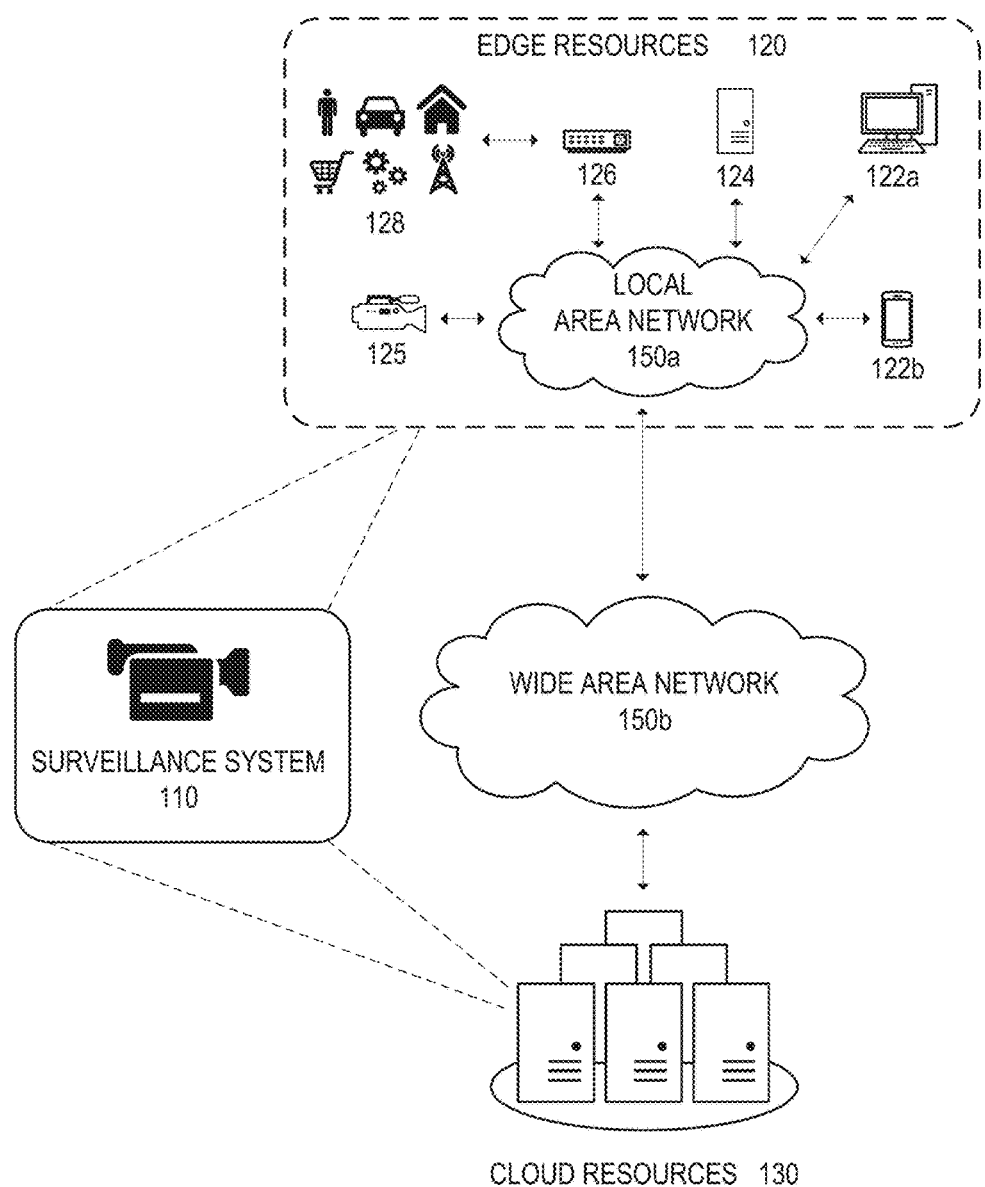
FIG. 1 illustrates an example of a computing environment for tracking and identifying objects in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Camera-Orchestrated Object Tracking and Identification

Advancements in modern computing and computer vision technology, along with rapid deployments of cameras and other vision sensors, have led to an increased use of visual computing for a variety of mainstream applications and use cases, such as security and surveillance, transportation (e.g., traffic monitoring, navigation, parking, infrastructure planning, security or amber alerts), retail (e.g., customer analytics), enterprise applications, and so forth.

Further, many visual computing applications leverage some form of object tracking and identification, which are fundamental visual computing tasks that often involve tracking and/or identifying an object across multiple camera views. For example, multi-target multi-camera tracking (MTMCT) is a visual computing task that involves tracking multiple objects across multiple camera views (e.g., tracking customers in a retail store), and target re-identification (ReID) is a visual computing task that involves re-identifying the same object across multiple camera views and/or varying circumstances (e.g., different camera angles and lighting, changes in the object's appearance, and so forth).

Existing solutions for tracking and identifying objects across multiple camera views, however, suffer from various limitations. For example, existing solutions typically process video streams from different cameras independently, using algorithms such as facial recognition or license plate recognition to detect or identify objects in each video stream separately. This approach results in low accuracy, as the objects in each video stream are identified in isolation rather than by collectively leveraging the respective video streams, which translates to a lack of context during the processing of each video stream and further requires each video stream to be completely reprocessed from scratch. For example, the identification and tracking of an object in a particular video stream is restricted to the period of time in which the object is within the field of view of an individual camera, and thus the object is often identified with low accuracy due to the complexity of capturing the object in a video frame with the appropriate angle, lighting, quality, and so forth. Thus, using existing approaches, tracking and/or identifying objects (e.g., people, cars) as they move across multiple areas or zones covered by different cameras can be highly challenging and complex, as there is no correlation between separate video feeds, and it is often impossible to independently identify the same object at each individual camera (e.g., due to camera angle or lighting). Accordingly, existing approaches often yield inaccurate results and low rates of success, while also wasting significant computing resources (e.g., video processing, storage, and/or bandwidth resources).

For example, with respect to identifying people using facial recognition, it can be challenging to accurately identify the face of even a single person who is cooperating or participating in the facial recognition process (e.g., a user unlocking a smartphone). Naturally, these challenges scale up dramatically when facial recognition is expanded to identify the faces of numerous people, across multiple cameras, and without any cooperation or participation from the people being identified.

As another example, with respect to tracking and identifying cars for smart automotive solutions, the license plate of a particular car may be visible to some cameras but not others, thus rendering it difficult to track and identify the car across multiple cameras. For example, with respect to a smart parking solution, while it may be feasible for a camera at the entrance of a parking lot to identify the license plate of a car entering the parking lot, it may be difficult for other cameras to identify the license plate of that same car as it navigates around the parking lot and moves towards a particular parking spot.

Accordingly, existing surveillance systems are often inaccurate and unreliable for tracking and identifying objects, largely because there is no correlation between separate video feeds of different cameras (e.g., correlations based on time, position, 3D modeling, and so forth). Further, in many cases, the shortcomings of existing surveillance systems may be poorly supplemented by manual human review of surveillance footage, which itself is inaccurate, error prone, time consuming, costly, and very difficult to scale as the number of cameras and objects increases.

Accordingly, this disclosure describes various embodiments for tracking and identifying objects using intelligent camera orchestration. In particular, by orchestrating the video feeds of multiple cameras, it is possible to capture and/or derive information and other characteristics associated with an object that cannot otherwise be obtained using only a single camera or multiple cameras that operate independently.

In some embodiments, for example, when an object is initially captured by one or more cameras of a surveillance system, the video streams from those cameras can be processed to generate metadata describing the current state of the object (e.g., physical characteristics, behavior, position). This metadata can then be used to predict a future state of the object, and the predicted future state can be used to proactively configure other cameras in the surveillance system to subsequently capture, detect, and/or identify the object under optimal conditions. For example, based on the current position, direction of travel, and/or speed of the object, a future time and position of the object can be predicted, and the camera(s) with the best perspective of the predicted future position can then be configured to subsequently capture the object at the predicted time using optimal camera settings and/or parameters (e.g., zoom, pan, luminance). The cameras in the surveillance system can be continuously configured using this proactive approach based on the latest predictions derived from the most recent metadata captured about the object's current state. Further, in some embodiments, visual representations of the object captured by multiple cameras may be stitched together and/or consolidated in order to improve the chances of successfully identifying the object using computer vision algorithms (e.g., facial recognition). In this manner, the object can be captured, identified, and/or tracked across the respective cameras with greater efficiency and accuracy using intelligent camera orchestration decisions.

In general, the metadata associated with the current state of an object can include any type of information that allows the object to be subsequently captured, identified, and/or tracked by the cameras in the surveillance system. For example, the metadata may enable the object to be captured by certain cameras under optimal conditions, and/or further recognized, identified, and/or tracked across video streams captured by those cameras. In particular, the metadata may identify various features and characteristics associated with the object itself, as well as its current circumstances, surroundings, situation, environment, and/or behavior. In some embodiments, for example, the metadata may identify the object type (e.g., person, car), physical characteristics (e.g., size, dimensions, color), orientation, behavior, distance from certain cameras, position, speed, direction of travel, path, trajectory, and so forth.

Further, this metadata can be used to predict the future state of the object. In some embodiments, for example, the size, position, speed, and/or direction of the object can be used to predict where the object will be in the near future, what path the object will take, and so forth.

For example, with respect to people tracking and identification, when a new person enters an area covered by an array of cameras, the video stream of the first camera that captures the person may be used to attempt to identify the person using facial recognition and/or to generate initial metadata associated with the current state of the person. The initial metadata can be used to make predictions about the person, such as where the person is heading, and these predictions can then be used to proactively configure certain cameras to subsequently capture the person in optimal conditions (e.g., time, position, zoom, pan, and/or luminance). For example, if the person could not be identified using facial recognition based on the first camera stream, the predictions about the future state of the person can be used to proactively configure another camera to capture the person in circumstances that are optimal for successful facial recognition. In particular, another camera that has a good view of an area where the person is predicted to be in the near future could be configured to capture a high quality, close-up image of the person's face. Further, in order to track the person effectively, cameras that provide good views of a path that the person is predicted to follow could be configured to capture the person at appropriate times and positions along the predicted path.

In some embodiments, for example, these predictions may be derived from the metadata using machine learning. For example, a machine learning model may be trained to continuously learn behaviors and patterns of people or objects in order to generate corresponding predictions about their future state, such as where they will be located, what path they will follow, and/or when a suitable image of them can be captured by a particular camera for identification purposes. As an example, if a person entering an area covered by surveillance cameras is initially captured with a hand occluding the person's face, a machine learning model can be used to predict a moment when the person's face will be visible to a particular camera. In this manner, the particular camera can be proactively configured to capture the person's face at the appropriate moment and with optimal camera settings, allowing the person to be successfully identified using facial recognition.

Further, by identifying the ideal moment in a particular camera stream to run the object identification algorithm (e.g., performing facial recognition on an upcoming video frame that is predicted to include a frontal view of a person's face), the utilization of computing resources is also reduced.

In various embodiments, real-world data leveraged by the intelligent camera orchestration functionality may be represented numerically or mathematically, such as using vectors (e.g., feature vectors, motion vectors, and so forth). A feature vector, for example, may be an n-dimensional vector of numerical values that is used to represent information associated with an object in a mathematical and easily analyzable manner. In this manner, feature vectors can be leveraged to reduce real-world data to a more concise and efficient representation that can be easily processed and analyzed for camera orchestration purposes, such as using machine learning techniques. In various embodiments, for example, feature vectors may be used to represent detected objects (e.g., physical characteristics, identity), object states (e.g., movement, behavior), camera configurations (e.g., number of cameras, camera positions, camera views or frames-of-reference, camera settings), and so forth.

In some embodiments, for example, a feature vector may be used to represent an object's identity, physical characteristics, current or future states, and so forth. For example, a feature vector may represent physical characteristics of the object using numerical values corresponding to its size, shape, number of sides, color, raw pixel data, and so forth. A feature vector may also represent the current or future state of an object using numerical values corresponding its position, movement, behavior, and so forth.

In some cases, for example, the feature vector may include position coordinates corresponding to the object's actual or predicted position. The feature vector may also include a motion vector corresponding to the actual or predicted movement of the object. The motion vector, for example, could represent linear movement as a line that corresponds to a linear trajectory of the object. The motion vector could also represent non-linear movement as a line that corresponds to the tangent of a non-linear trajectory of the object. Further, in some cases, object movement could also be represented using a collection of points and/or a mathematical formula that maps to a corresponding motion trajectory.

Further, vectors may also be used to represent the configuration of cameras in the surveillance system, including the number of cameras, camera positions, camera views or frames-of-reference (e.g., frame-of-reference differentials), camera settings, and so forth.

In this manner, the intelligent camera orchestration functionality may represent some or all of its data using such numerical or mathematical formats, such as vector-based formats, to improve the performance and efficiency of the solution.

In some embodiments, it may also be desirable to synchronize the timing and/or clocks of the respective cameras to ensure that the orchestrated camera activities are performed at the appropriate times. For example, in some cases, synchronization may be performed periodically to compensate for clock drift that may occur among the cameras depending on the accuracy and frequency of their crystal oscillators, environmental conditions such as temperature, and so forth.

In many cases, it may be sufficient to synchronize the cameras with millisecond level accuracy. Accordingly, in some embodiments, camera synchronization may be implemented using a network time protocol (NTP) server, which is a server that synchronizes the time of each camera individually. For example, the NTP server may be hosted in the cloud or on an internal or local network that the cameras are deployed on. NTP is supported by many existing smart cameras and/or internet protocol (IP) cameras. Alternatively, or additionally, the cameras may independently perform time synchronization among each other. For example, a master camera may be selected for synchronization purposes, and the master camera may synchronize the timing and/or clocks of the remaining cameras.

In some cases, it may be desirable to synchronize the cameras with a higher level of prevision and accuracy (e.g., less than a millisecond). Accordingly, in some embodiments, camera synchronization may alternatively be implemented using the Precision Time Protocol (PTP) (e.g., as defined by the IEEE 1588/802.1AS standards).

The embodiments described throughout this disclosure can be used for a variety of surveillance, security, and/or tracking use cases, including smart homes, smart buildings, smart cities, smart manufacturing, Internet-of-Things (IoT), and so forth. For example, a smart home solution could be implemented to report the number of people in a home, the location of each person, the identity of each known person that has been identified, whether there are any unknown persons that could not be identified, and so forth. As another example, smart building and smart manufacturing solutions could implement smart perimeters and/or geo-fencing using the intelligent object identification and tracking functionality. Further, any Internet-of-Things (IoT) solution could leverage the intelligent object identification and tracking functionality to track IoT devices.

Example embodiments that may be used to implement the features and functionality of this disclosure will now be described with more particular reference to the attached FIGURES.

FIG. 1 illustrates an example of a computing environment 100 for tracking and identifying objects in accordance with certain embodiments. In the illustrated embodiment, computing environment 100 includes surveillance system 110, edge resources 120, cloud resources 130, and communication networks 150, as discussed further below.

Surveillance system 110 may include a plurality of cameras, along with one or more processors, for intelligently tracking and identifying objects. In various embodiments, the underlying components of surveillance system 110 may be deployed in the network edge 120 and/or distributed across both the network edge 120 and the cloud 130. In some embodiments, for example, surveillance system 110 may be implemented by a combination of edge devices 120, including cameras 125 (e.g., smart cameras with additional processing capabilities), edge processing devices 124 (e.g., standalone processing devices used for surveillance orchestration, microprocessors, field-programmable gate arrays (FPGAs), application-specific integrated circuits (ASICs)), edge gateways 126, and so forth. Alternatively, in some embodiments, surveillance system 110 may be distributed across both the network edge 120 and the cloud 130. For example, surveillance system 110 may be implemented using cameras 125 deployed in the network edge 120, along with one or more processors or servers deployed exclusively in the cloud 130 or otherwise distributed across both the cloud 130 and network edge 120.

Surveillance system 110 may implement some or all aspects of the object tracking and identification functionality described throughout this disclosure, either alone or in conjunction with other components of computing environment 100. In some embodiments, for example, surveillance system 110 may track and/or identify objects using intelligent camera orchestration decisions. For example, when an object is initially captured by one or more cameras of surveillance system 110, the video streams from those cameras may be processed by surveillance system 110 to generate metadata describing the current state of the object (e.g., physical characteristics, behavior, position). Surveillance system 110 may then use that metadata to predict a future state of the object, and based on the predicted future state, surveillance system 110 may then proactively configure other cameras to subsequently capture, detect, and/or identify the object under optimal conditions. The cameras of surveillance system 110 can be continuously configured using this proactive approach based on the latest predictions derived from the most recent metadata captured about the object's current state. In this manner, surveillance system 110 can capture, identify, and/or track an object across its respective cameras with greater efficiency and accuracy using intelligent camera orchestration decisions, as described further throughout this disclosure.

Further, in some embodiments, the timing and/or clocks of the respective cameras of surveillance system 110 may be periodically synchronized to ensure that the orchestrated camera activities are performed at the appropriate times. For example, in some embodiments, camera synchronization may be implemented using a dedicated network time protocol (NTP) server (e.g., hosted in the cloud 130 and/or in the edge 120), using independent coordination among the cameras, and/or using the Precision Time Protocol (PTP), among other possible approaches.

Edge resources 120 may include any components, devices, equipment, and/or "things" that are located, deployed, and/or connected near the "edge" of a communication network. In the illustrated embodiment, for example, edge resources 120 include end-user devices 122a,b (e.g., desktops, laptops, tablets, mobile phones and other devices, wearable devices), edge processing devices 124, cameras or vision sensors 125, edge gateways or routers 126, and various assets or "things" 128 (e.g., people, cars, buildings, manufacturing facilities, retail facilities, network or communication infrastructure, and any associated Internet-of-Things (IoT) devices). Edge resources 120 may communicate with each other and/or with other remote networks and resources (e.g., cloud resources 130) through one or more communication networks 150, such as local area network 150a and/or wide area network 150b. Further, in various embodiments, functionality of surveillance system 110 may be partially or fully implemented by certain edge resources 120, such as cameras 125 and/or edge processing devices 124. In addition, in various embodiments, certain edge resources 120 may be tracked by surveillance system 110, such as assets and/or IoT devices 128.

Cloud resources 130 may include any resources or services that are hosted remotely over a network, which may otherwise be referred to as in the "cloud." In some embodiments, for example, cloud resources 130 may be remotely hosted on servers in a datacenter (e.g., application servers, database servers). Cloud resources 130 may include any resources, services, and/or functionality that can be utilized by or for surveillance system 110 and/or edge resources 120, including but not limited to, visual computing applications and services, security services (e.g., surveillance, alarms, user authentication), IoT application and management services, data storage, computational services (e.g., data analytics, searching, diagnostics and fault management), mapping and navigation, geolocation services, network or infrastructure management, payment processing, audio and video streaming, messaging, social networking, news, and weather, among other examples.

Communication networks 150a,b may be used to facilitate communication between components of computing environment 100. In the illustrated embodiment, for example, edge resources 120 are connected to local area network (LAN) 150a in order to facilitate communication with each other and/or other remote networks or resources, such as wide area network (WAN) 150b and/or cloud resources 130. In various embodiments, computing environment 100 may be implemented using any number or type of communication network(s) 150, including local area networks, wide area networks, public networks, the Internet, cellular networks, Wi-Fi networks, short-range networks (e.g., Bluetooth or ZigBee), and/or any other wired or wireless communication networks or mediums.

Any, all, or some of the computing devices of computing environment 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of computing environment 100 are described further in connection with the remaining FIGURES. Accordingly, it should be appreciated that computing environment 100 of FIG. 1 may be implemented with any aspects of the embodiments described throughout this disclosure.

Figure 2:
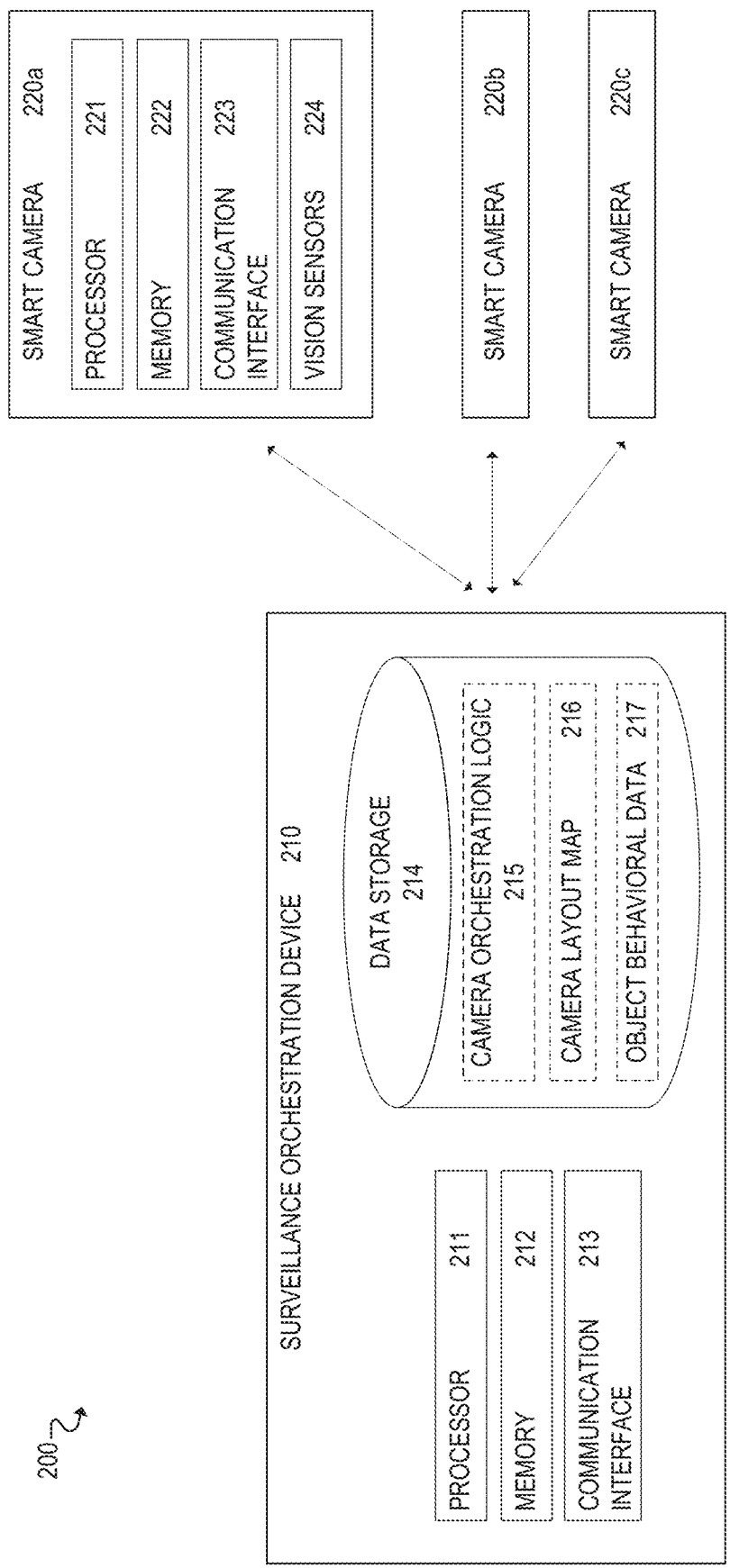
FIG. 2 illustrates an example embodiment of a surveillance system for tracking and identifying objects using intelligent camera orchestration.

FIG. 2 illustrates an example embodiment of a surveillance system 200 for tracking and identifying objects using intelligent camera orchestration. In some embodiments, for example, the components of surveillance system 200 may be used to implement the object tracking and identification functionality described throughout this disclosure. In the illustrated embodiment, surveillance system 200 includes a surveillance orchestration device 210 and a plurality of smart cameras 220a-c, as described further below.

The surveillance orchestration device 210 includes one or more processors 211, memory elements 212, communication interfaces 213, and data storages 214. The data storage 214 contains camera orchestration logic 215, a camera layout map 216, and object behavioral data 217. The camera orchestration logic 215 includes logic and/or instructions that can be executed by a processor 211 to perform intelligent camera orchestration in the manner described throughout this disclosure. The camera layout map 216 identifies the layout of the respective cameras 220a-c in surveillance system 200, such as the position and orientation of each camera, which is used to facilitate camera orchestration decisions. The object behavioral data 217 may include a collection of information associated with the actual behavior of various objects in many different scenarios. In some embodiments, the object behavioral data 217 may be used to generate predictions about an object's current behavior and continuously learn new behaviors (e.g., using machine learning) in order to perform intelligent camera orchestration decisions, as described further throughout this disclosure.

The smart cameras 220a-c each include one or more processors 221, memory elements 222, communication interfaces 223, and vision sensors 224 (e.g., cameras). The vision sensors 224 can include any type of sensors that can be used to capture or generate visual representations of their surrounding environment, such as cameras, depth sensors, ultraviolet (UV) sensors, laser rangefinders (e.g., light detection and ranging (LIDAR)), infrared (IR) sensors, electro-optical/infrared (EO/IR) sensors, and so forth. In particular, the vision sensors 224 are used to generate video streams associated with the environment in which an associated smart camera 220 is deployed. In various embodiments, a smart camera 220 may store video streams in memory 222, process video streams using its own processor 221, and/or transmit video streams and/or associated metadata over communication interface 223 to another component for processing and/or storage purposes (e.g., surveillance orchestration device 210).

The respective components of surveillance system 200 may be used to implement the intelligent camera orchestration functionality described further throughout this disclosure. Moreover, in various embodiments, the underlying components and functionality of surveillance system 200, surveillance orchestration device 210, and/or smart cameras 220 may be combined, separated, and/or distributed across any number of devices or components.

Figure 3:
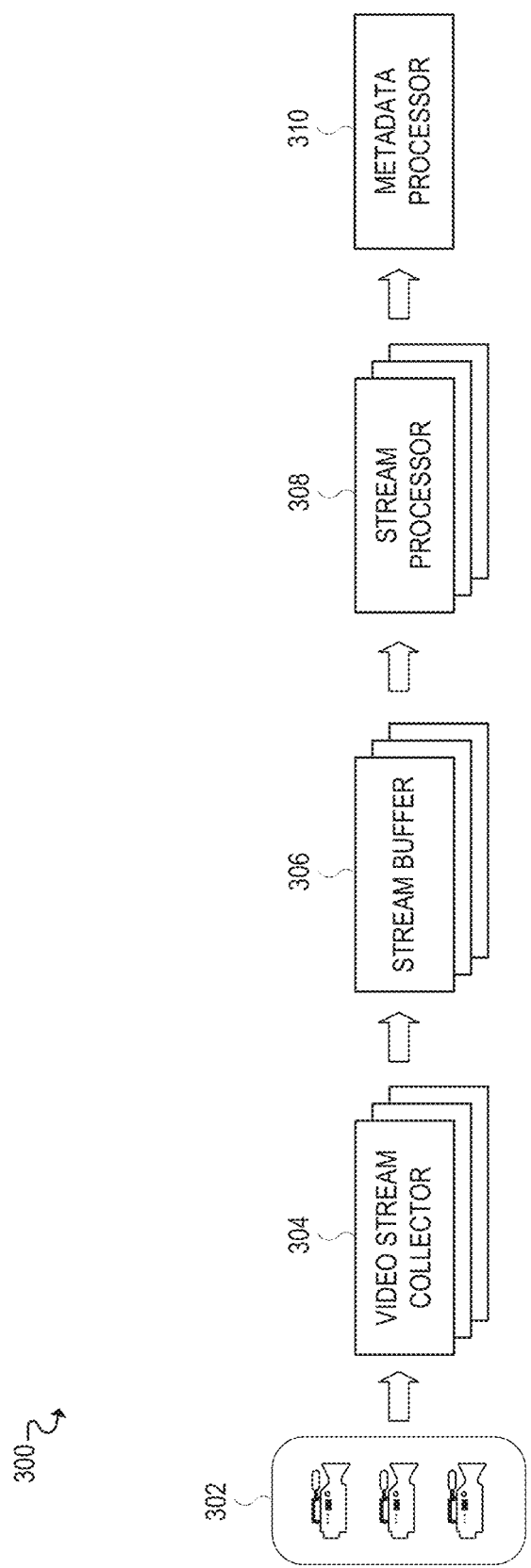
FIG. 3 illustrates an example visual processing pipeline for tracking and identifying objects using intelligent camera orchestration.

FIG. 3 illustrates an example visual processing pipeline 300 for tracking and identifying objects using intelligent camera orchestration. In the illustrated example, a plurality of cameras 302 (and/or other types of vision sensors) are used to capture visual data associated with their surrounding environment. For example, in some embodiments, the cameras 302 may be three-dimensional (3D) cameras and/or may include depth sensors, thus enabling the cameras 302 to determine the relative depth or distance of objects that are captured. In this manner, the location of objects captured by the cameras 302 can be easily ascertained (e.g., based on the relative depth or distance of an object to one or more cameras at known locations).

The video feeds generated by the cameras 302 are communicated to a video stream collector 304, which is responsible for ingesting the collective video feeds and converting them into video frames (e.g., using the Open Source Computer Vision (OpenCV) library or a similar technology).

The resulting video frames are then provided to a stream buffer 306, which provides reliable temporary storage for the video frames. The stream buffer 306 must be both reliable and scalable in order to ensure that it can process and store as many video frames as required for varying use cases. Accordingly, in some embodiments, the stream buffer 306 may be implemented using Apache Kafka or a similar technology.

A stream processor 308 is responsible for retrieving the video frames from the temporary storage of the stream buffer 306, and then processing them using the appropriate computer vision algorithms required for the particular use case (e.g., facial recognition, license plate recognition, object tracking, and so forth). The stream processor 308 then produces a stream of metadata describing the situation or state detected by the particular algorithms used to process the video frames. In some cases, for example, the metadata may indicate the number of objects detected in the video frames, along with a variety of information or features associated with each object, such as object type (e.g., person, car), identity (e.g., name, license plate number), physical characteristics (e.g., size, dimensions, color), orientation, behavior, distance from certain cameras, position, speed, direction of travel, path, trajectory, and so forth.

The metadata generated by the stream processor 308 is then provided to a metadata processor 310, which is a key component of processing pipeline 300. The metadata processor 310 evaluates the metadata, correlates all the information derived from the collective video feeds, generates predictions based on those correlations, and proactively configures the surveillance cameras to subsequently capture, detect, and/or identify certain objects under optimal conditions. In some embodiments, for example, the insights and predictions derived by the metadata processor 310 may be used to retro-feed certain cameras via the control plane with tailored configuration settings for capturing the appropriate information from the area covered by the array of cameras.

In some embodiments, for example, the metadata processor 310 may use machine learning to derive correlations and generate predictions from the metadata. For example, one or more machine learning models may be trained to continuously learn behaviors and patterns of people or objects in order to generate corresponding predictions about their future state, such as where they will be located, what path they will follow, and/or when a suitable image of them can be captured by a particular camera for identification purposes. In this manner, the metadata processor 310 continuously correlates information derived from the collective video feeds and enhances the models used by the algorithms.

Figure 4:
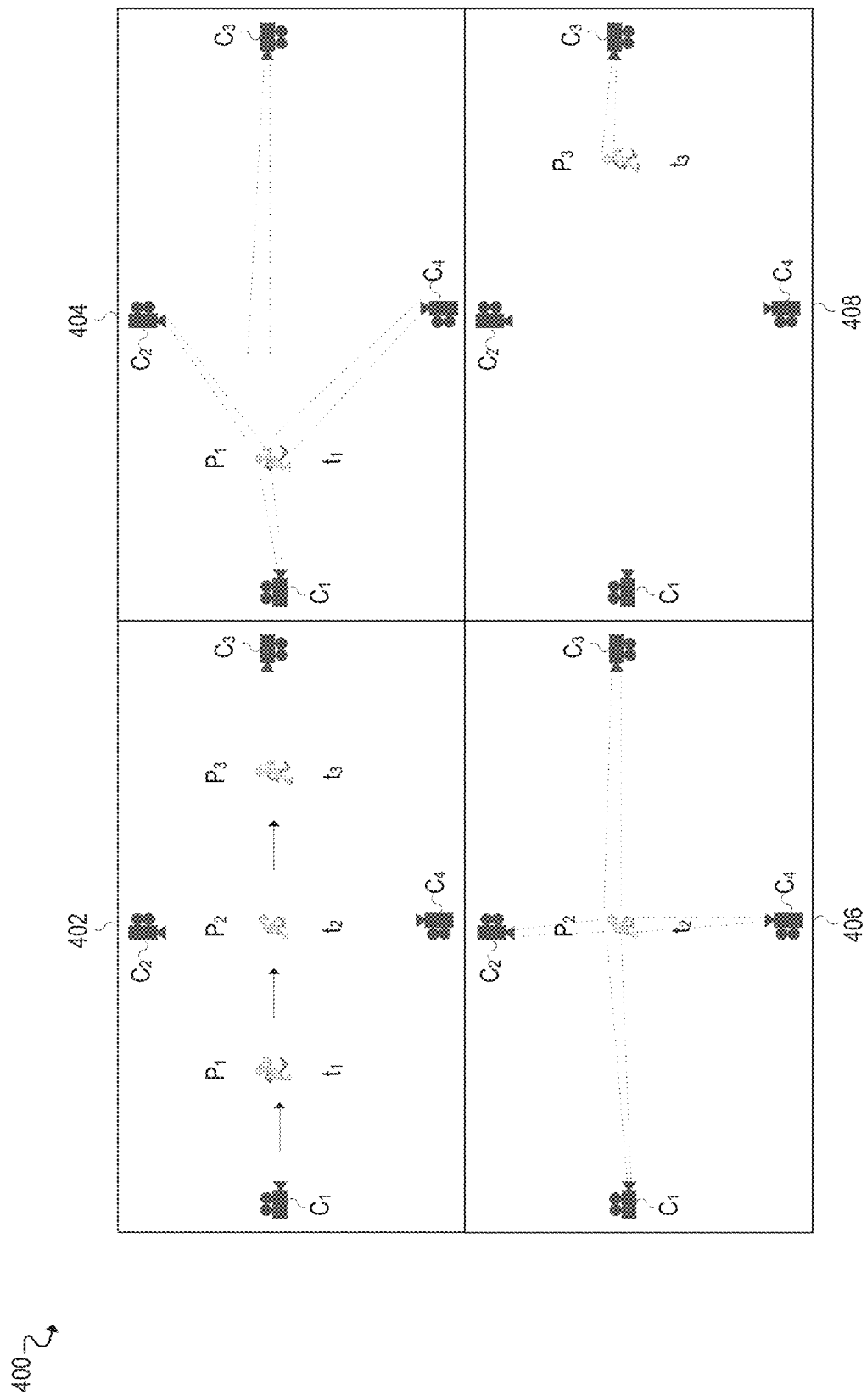
FIG. 4 illustrates an example facial recognition use case implemented using intelligent camera orchestration.

FIG. 4 illustrates an example facial recognition use case 400 implemented using intelligent camera orchestration. In the illustrated example, a person traveling along a particular trajectory is tracked using multiple cameras. The illustrated example depicts an overview 402 of the scenario evaluated by this use case, along with various stages of evaluation 404, 406, 408 at certain positions along the person's trajectory.

As shown in the overview 402, the person is tracked by four cameras $C_1$-$C_4$ as the person travels along a trajectory defined by positions $P_1$-$P_3$. The use case begins as the person enters the area covered by the array of cameras $C_1$-$C_4$, and it continues as the person walks from $P_1$ to $P_2$ and $P_2$ to $P_3$.

Stage 404 illustrates the person in position $P_1$ at time $t_1$. At this stage, cameras $C_1$, $C_2$, and $C_4$ cannot identify the person at position $P_1$ because they have a bad angle. While camera $C_3$ has a good angle of the person at position $P_1$, it is too far away to successfully perform facial recognition. Certain information or metadata can still be captured for purposes of tracking the person, however, such as physical characteristics that allow the person to be recognized in subsequent video feeds or frames (e.g., clothing color, hair color, height), along with situational or behavioral characteristics that allow the person's future behavior to be predicted.

For example, based on the person's current position $P_1$, direction of travel, and speed at time $t_1$, the surveillance system may predict (e.g., using deep learning) that the person is traveling towards position $P_2$ and will arrive there at time $t_2$. Accordingly, the surveillance system may proactively configure camera $C_3$ to capture a facial snapshot of the person at time $t_2$.

As shown at stage 406, the person then continues walking and reaches position $P_2$ at time $t_2$. At position $P_2$, the person is within range of camera $C_3$, and that camera has already been prepared to capture a facial snapshot, but the person's face cannot be captured because the person is looking down. Further, cameras $C_1$, $C_2$, and $C_4$ still have a bad angle of the person's face at position $P_2$, so those cameras are simply used to continue tracking the person using the metadata captured in the prior stage (e.g., physical characteristics). In this manner, the metadata can be continuously updated or supplemented to reflect the person's current state.

Further, based on the most recently captured metadata, the surveillance system may then predict that the person is traveling towards position $P_3$ and will arrive there at time $t_3$. Accordingly, the surveillance system may proactively configure camera $C_3$ to capture a facial snapshot of the person at time $t_3$. For example, prior to the person reaching position $P_3$, camera $C_3$ may be configured to capture an image of the person at the appropriate moment in time (time $t_3$), and the camera's actuators may even be leveraged to optimize certain camera settings (e.g., orientation, angle, zoom, pan, focus, and so forth).

As shown at stage 408, the person continues walking and reaches position $P_3$ at time $t_3$. At position $P_3$, camera $C_3$ is able to successfully capture an image of the person's face, and facial recognition is then used to determine the person's identity. Moreover, in order to conserve computing resources at this stage, the surveillance system may decide to selectively forego, avoid, and/or disable any processing associated with the remaining cameras based on its prediction that camera $C_3$ would be successful.

Figure 5:
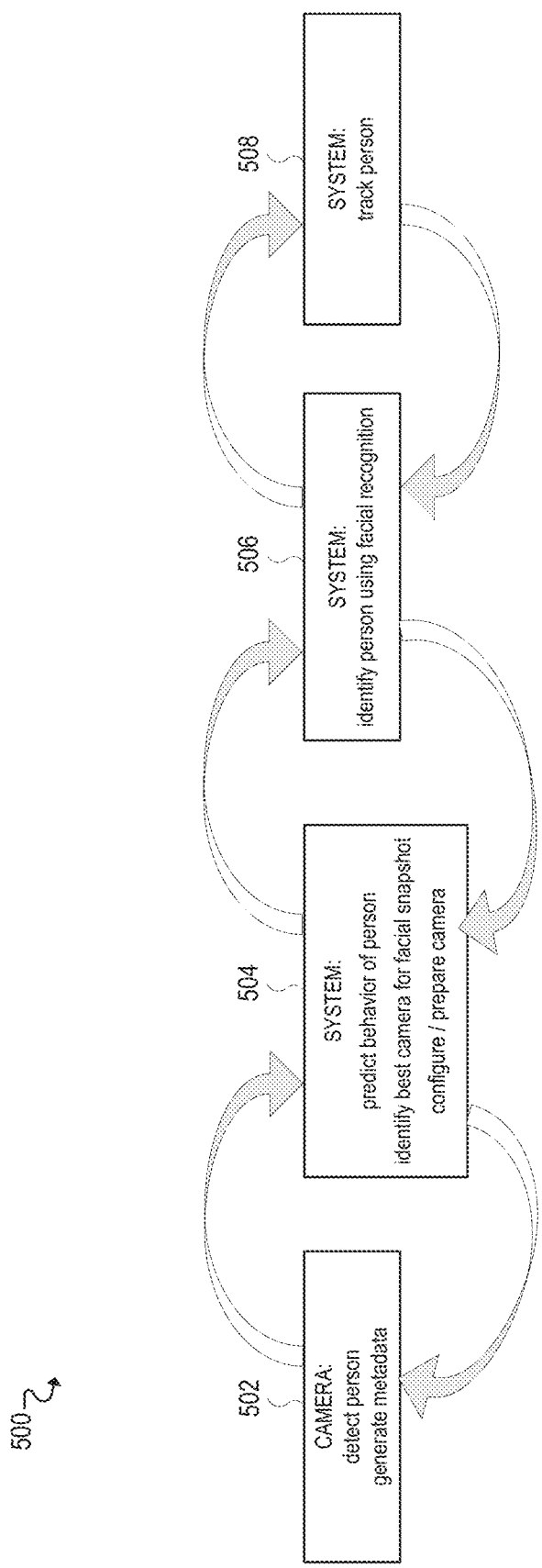
FIG. 5 illustrates an example process flow for performing facial recognition using intelligent camera orchestration.

FIG. 5 illustrates an example process flow 500 for performing facial recognition using intelligent camera orchestration.

The example process flow 500 begins by processing the video feeds captured by a collection of cameras and/or vision sensors in order to detect people in an area that is under surveillance or otherwise being monitored (block 502). When a person is detected in one or more video feeds, the associated video frames are further processed to extract metadata associated with the person, such as speed, distance, orientation, physical characteristics (clothing color, hair color, size/height/weight), and so forth.

Based on the metadata, the surveillance system predicts the future state or behavior of the person, and also identifies the best camera(s) to use for capturing the person's face at certain moments in the future (block 504). Based on these predictions, the surveillance system then proactively configures the selected camera(s) to capture the person's face at the appropriate moments in time. The system continues collecting metadata (block 502) and proactively configuring cameras (block 504) in this manner until the person's face is captured in suitable conditions for facial recognition.

Once the person's face has been adequately captured, the subject person is identified using facial recognition (block 506). The surveillance system then continues tracking the person as long as the person remains within the area that is under surveillance (block 508). For example, the process flow 500 may continuously cycle through blocks 502-508 to collect updated metadata associated with the person (block 502), predict future behavior and proactively configure cameras to capture the person (block 504), identify (block 506), and/or track the person (block 508).

Figure 6A:
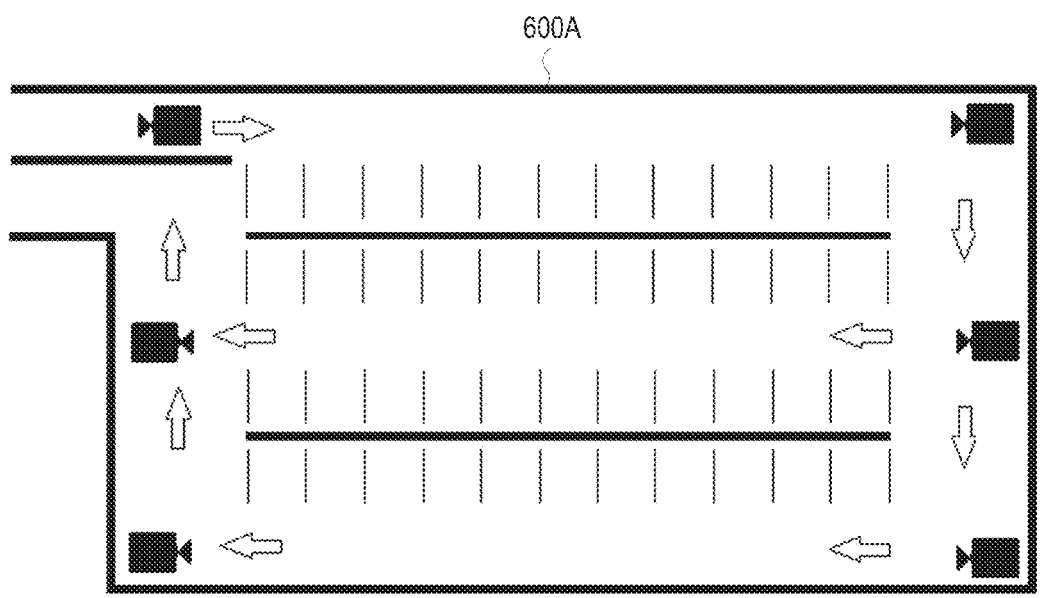
FIGS. 6A and 6B illustrate example smart parking solutions.
Figure 6B:
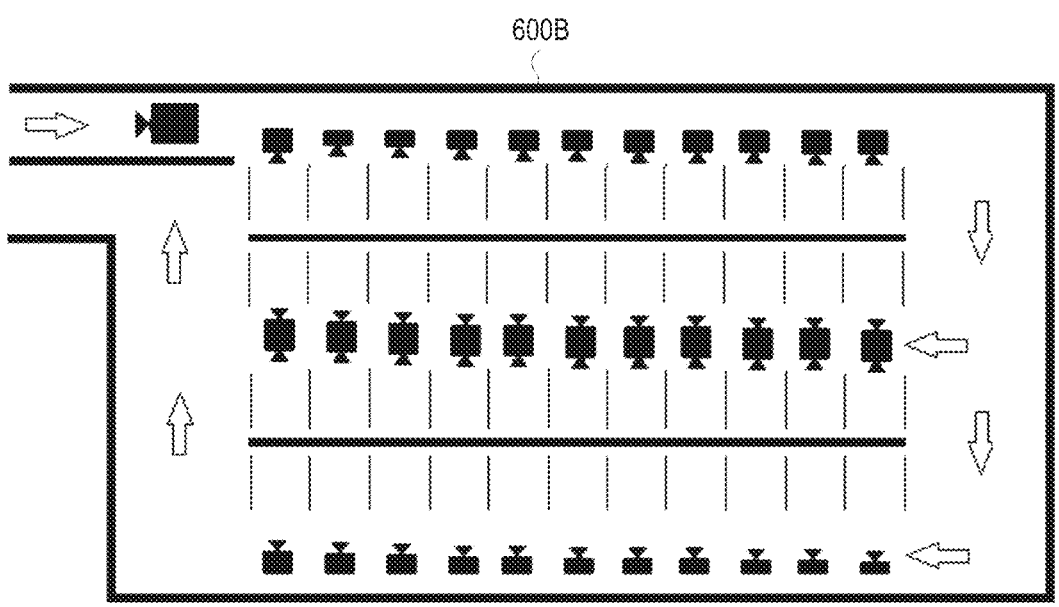

FIGS. 6A and 6B illustrate example smart parking solutions. In particular, FIG. 6A illustrates a smart parking solution 600A implemented using intelligent camera orchestration, while FIG. 6B illustrates a smart parking solution 600B implemented without using intelligent camera orchestration.

In the example of FIG. 6A, a car entering the parking lot can be captured, along with its license plate, in the video stream of a camera positioned near the entrance of the parking lot. The car can then be identified from the video stream using license plate recognition algorithms, and the video stream can be further processed to generate metadata describing the car and its current state (e.g., physical characteristics, position, direction of travel, speed).

The metadata can then be used to track the car (e.g., based on physical characteristics), predict where the car is going (e.g., based on its current position, direction of travel, and speed), and proactively configure the appropriate cameras in the parking lot to continue tracking and capturing the car as it travels to a parking spot. In this manner, the car's eventual parking spot can be identified.

The intelligent camera orchestration leveraged by the smart parking solution of FIG. 6A dramatically reduces the number of cameras required to identify and track cars to their parking spots. By way of comparison, the smart parking solution of FIG. 6A (which uses intelligent camera orchestration) uses 4-6 cameras, while the smart parking solution of FIG. 6B (which does not use intelligent camera orchestration) requires 34 cameras. This is because current solutions that do not leverage intelligent camera orchestration, such as the solution of FIG. 6B, typically require 1 camera for every 1 to 3 parking spots, which is very costly and complex to deploy, operate, and maintain.

Figure 7:
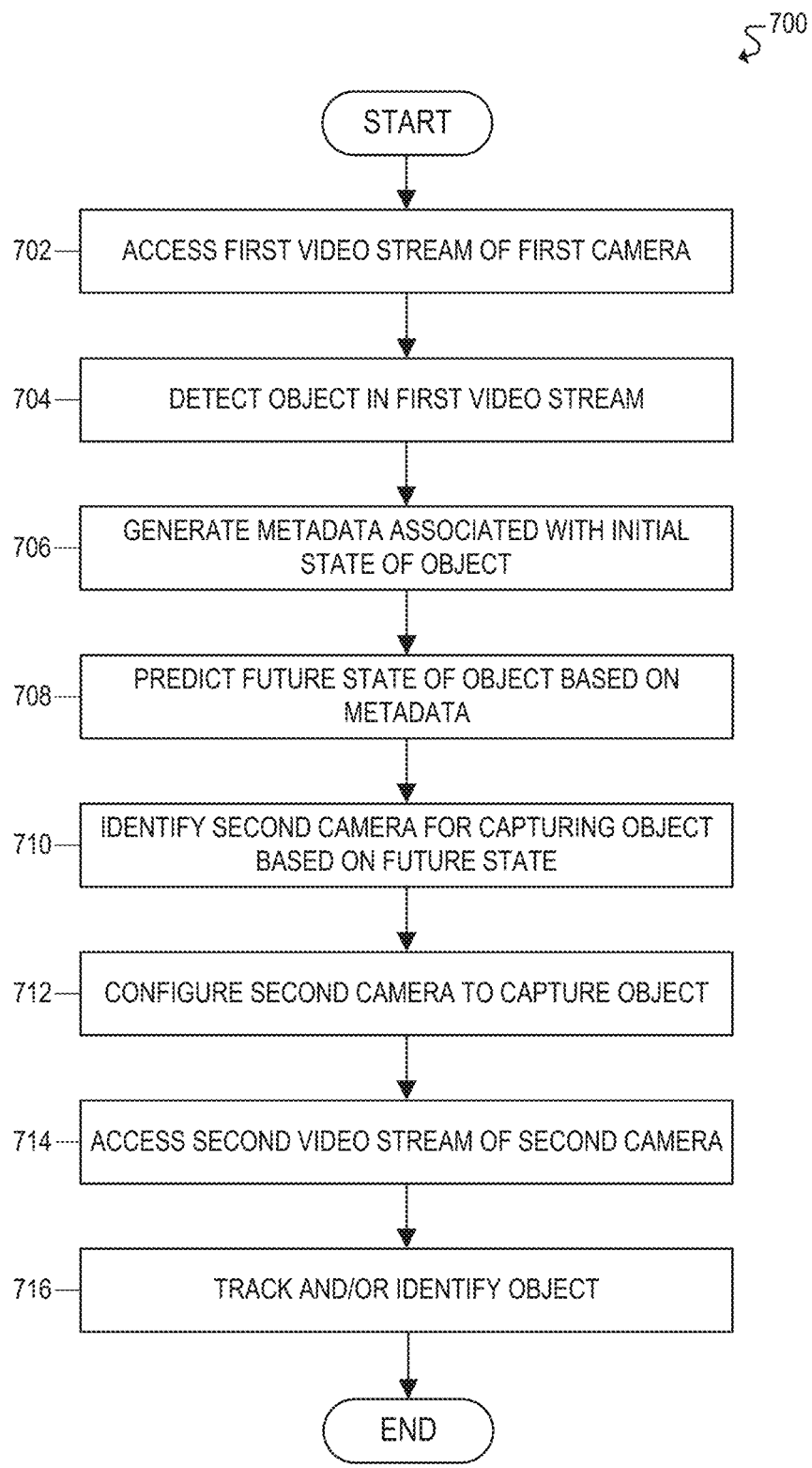
FIG. 7 illustrates a flowchart for an example embodiment of object tracking and identification using intelligent camera orchestration.

FIG. 7 illustrates a flowchart 700 for an example embodiment of object tracking and identification using intelligent camera orchestration. In some cases, for example, flowchart 700 may be implemented using the embodiments and functionality described throughout this disclosure.

The flowchart may begin at block 702 by accessing a first video stream of a first camera. In some embodiments, for example, the first camera may be associated with a surveillance system that includes a collection of cameras and/or vision sensors.

The flowchart may then proceed to block 704 to detect an object in the first video stream of the first camera. In some embodiments, for example, the object (e.g., person, car, animal) may be detected by processing the first video stream using the appropriate object detection algorithms for the particular use case. In some cases, after detecting the object, the first video stream may be processed further in order to continue tracking the object. An object identification algorithm (e.g., facial recognition, license plate recognition) may also be used to attempt to identify the object based on the first video stream. Depending on the circumstances, however, it may or may not be possible to identify the object using the first video stream.

The flowchart may then proceed to block 706 to generate metadata associated with an initial state of the object. The initial state of the object, for example, may be the object's state at a first point in time in which the object was captured by the first camera. Further, the metadata associated with the initial state of the object may be generated by processing the first video stream using appropriate computer vision algorithms to extract various information and characteristics associated with the object. For example, the resulting metadata may indicate the object type (e.g., person, car), identity (e.g., name, license plate number), physical characteristics (e.g., size, dimensions, color), behavioral characteristics, orientation, distance from certain cameras, position, speed, direction of travel, path, trajectory, and so forth.

The flowchart may then proceed to block 708 to predict a future state of the object based on the metadata. In some embodiments, for example, the information contained in the metadata can be processed and correlated in order to generate predictions about the object at various moments in the future. For example, in some cases, the current position, direction of travel, speed, and/or behavior of the object can be used to predict the location of the object at various moments in the future, the path or trajectory that the object is expected to take, expected future behavior of the object, and so forth.

In some embodiments, machine learning may be used to derive these predictions from the metadata. For example, a machine learning model may be trained to continuously learn behaviors and patterns of objects in order to generate corresponding predictions about their future state, such as where they will be located, what path they will follow, and/or when a suitable image of them can be captured by a particular camera for identification and/or tracking purposes. In this manner, the machine learning model is trained to predict the future state of objects based on an earlier or initial state of the objects.

Further, the machine learning model can be continuously optimized or enhanced based on actual scenarios encountered and evaluated during live deployment. In some cases, for example, after predicting the future state of an object, the object's actual state at the predicted moment may be subsequently verified (e.g., based on video streams that capture the object at that moment in time). In this manner, the machine learning model can be optimized to learn a correlation between the actual state of the object and the metadata associated with the initial state of the object, thus improving the accuracy of its future predictions.

The flowchart may then proceed to block 710 to identify a second camera for capturing the object at a second point in time based on the object's predicted future state. For example, the object's predicted future state can be used to identify the best camera(s) to use for capturing the object in optimal conditions at certain moments in the future. Accordingly, a second camera may be identified as having the best perspective or view for capturing the object in optimal conditions at a predicted future location and point in time.

In some cases, for example, if the object could not be identified from the first video stream, the predictions about the object's future state can be used to identify a second camera that will be able to capture the object in conditions that will allow the object to be identified.

Accordingly, the flowchart may then proceed to block 712 to configure the second camera to capture the object at the second point in time. For example, the second camera may be proactively configured in order to subsequently capture, detect, and/or identify the object under optimal conditions at the second (future) point in time. In some embodiments, for example, the second camera may be configured with tailored camera settings and/or parameters (e.g., camera orientation, angle, zoom, pan, focus, luminance) that have been optimized for capturing the object at the second point in time. In this manner, the second camera may subsequently capture the object in a second video stream at the second point in time.

The flowchart may then proceed to block 714 to access the second video stream captured by the second camera, and then to block 716 to track and/or identify the object based on the second video stream. For example, the second video stream may be processed using the appropriate computer vision algorithms (e.g., object detection, facial recognition, license plate recognition) to detect, identify, and/or track the object in the second video stream.

In some embodiments, the object may continue to be tracked in this manner as long as the object remains within the area that is under surveillance by the various cameras. In particular, the cameras in the surveillance system can be continuously configured using this proactive approach based on the latest predictions derived from the most recent metadata captured about the object's current state. In this manner, the object can be captured, identified, and/or tracked across the respective cameras with greater efficiency and accuracy using intelligent camera orchestration decisions.

At this point, the flowchart may be complete. In some embodiments, however, the flowchart may restart and/or certain blocks may be repeated. For example, in some embodiments, the flowchart may restart at block 702 to continue tracking and/or identifying objects using intelligent camera orchestration.

Example Internet-of-Things (Iot) Implementations

FIGS. 8-11 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
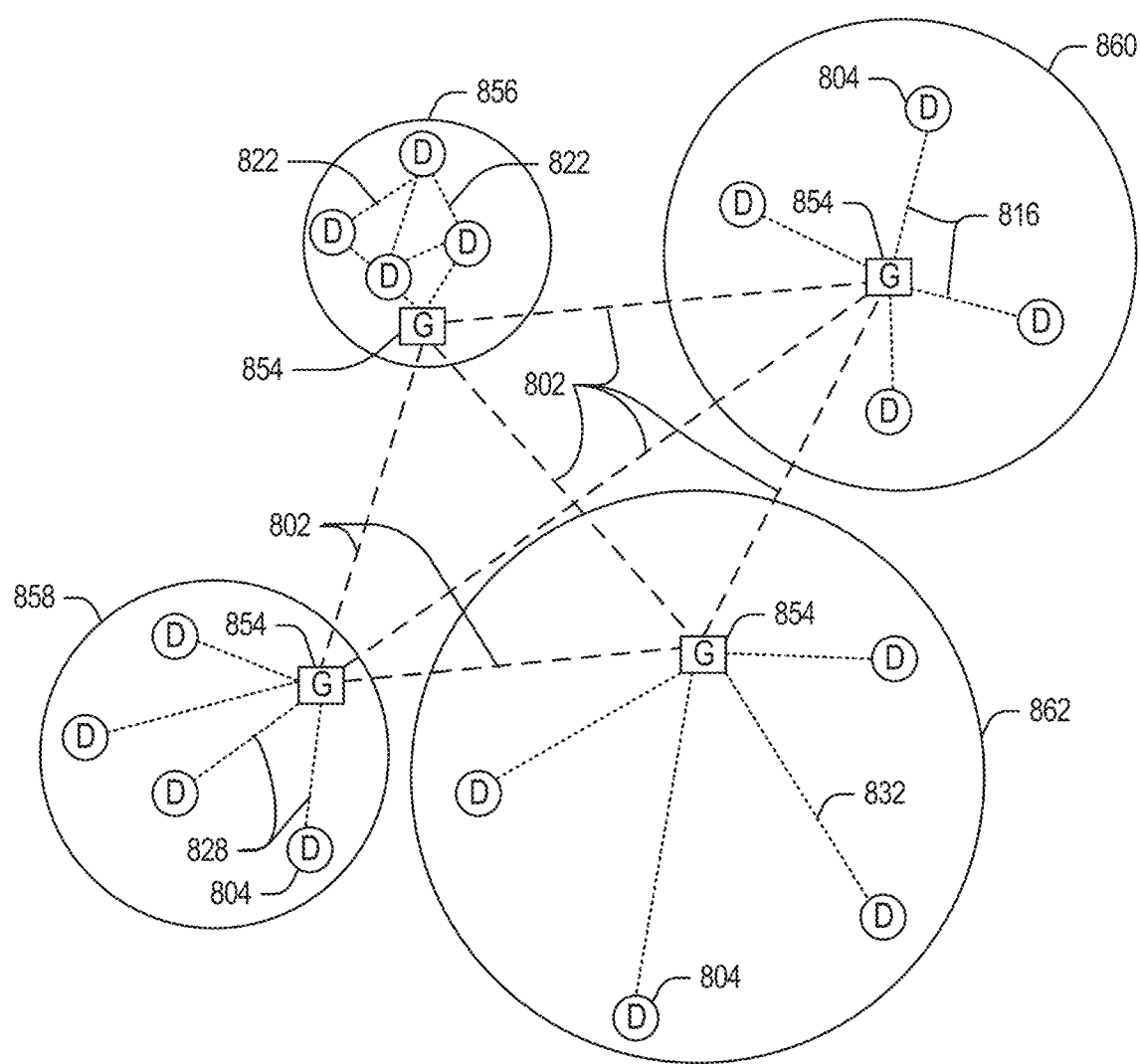
FIGS. 8, 9, 10, and 11 illustrate examples of Internet-of-Things (IoT) networks and architectures that can be used in accordance with certain embodiments.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8-11, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

Figure 9:
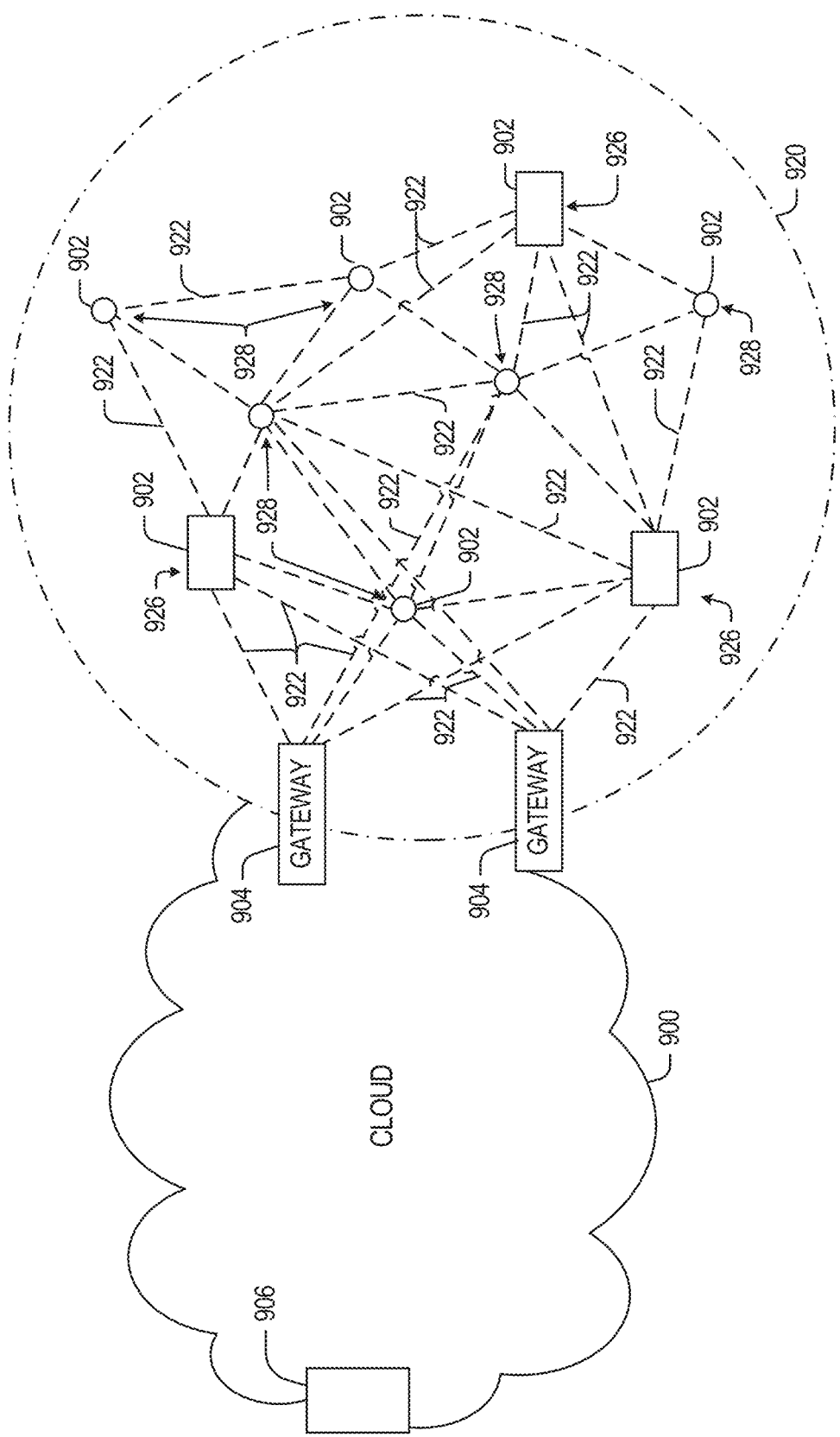

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

Figure 10:
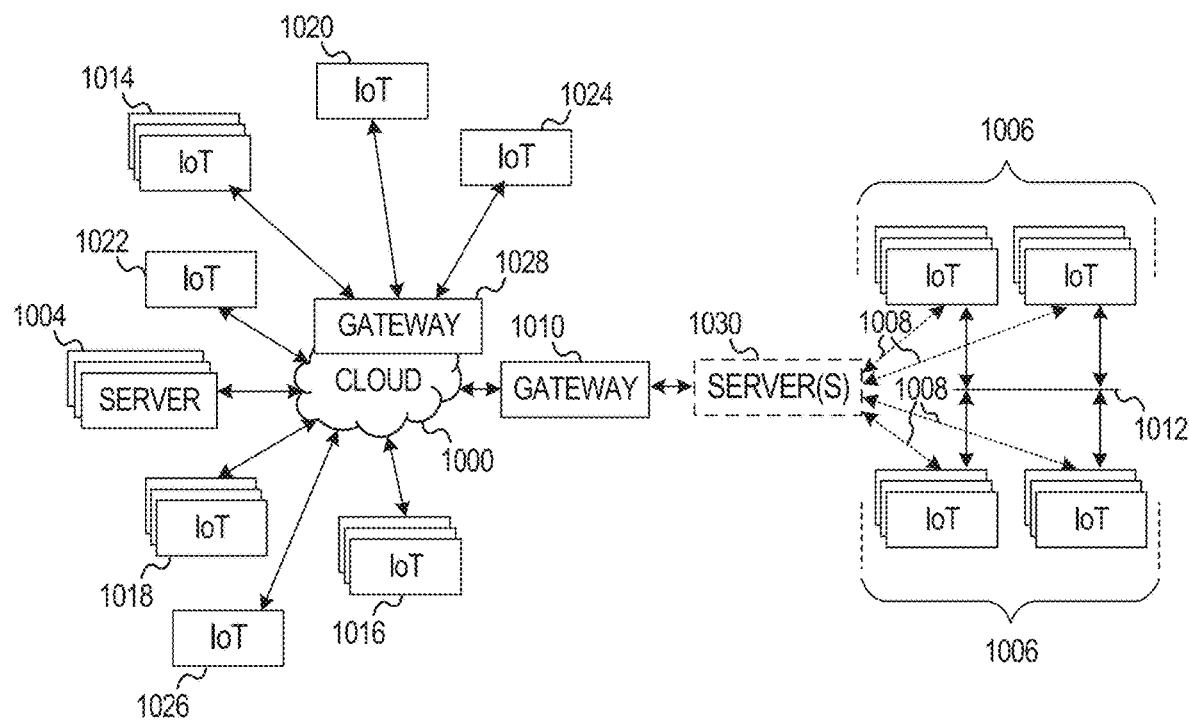

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
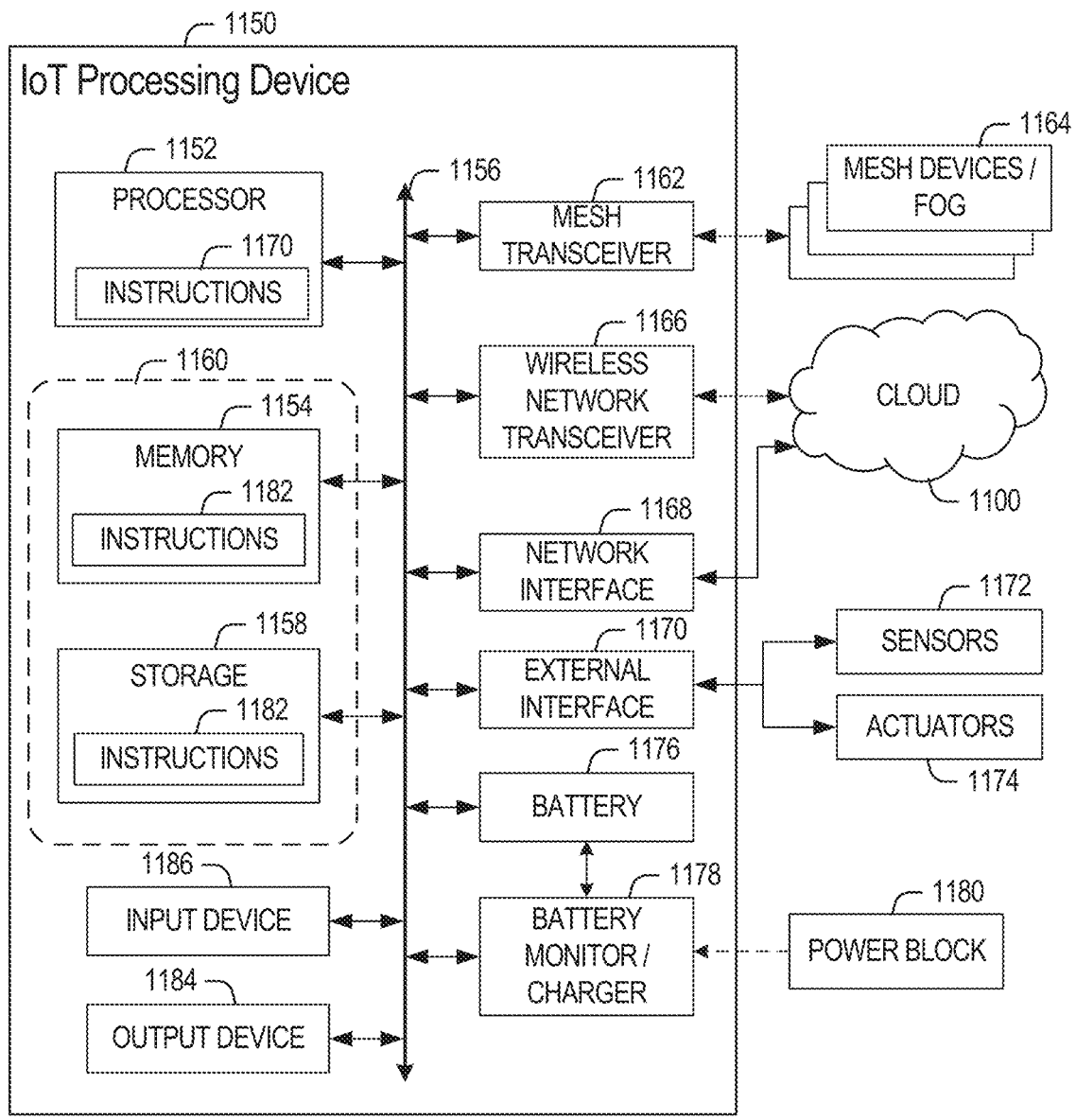

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may include storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and diagram(s) of operations and functionality described throughout this disclosure.

Example Computing Architectures

Figure 12:
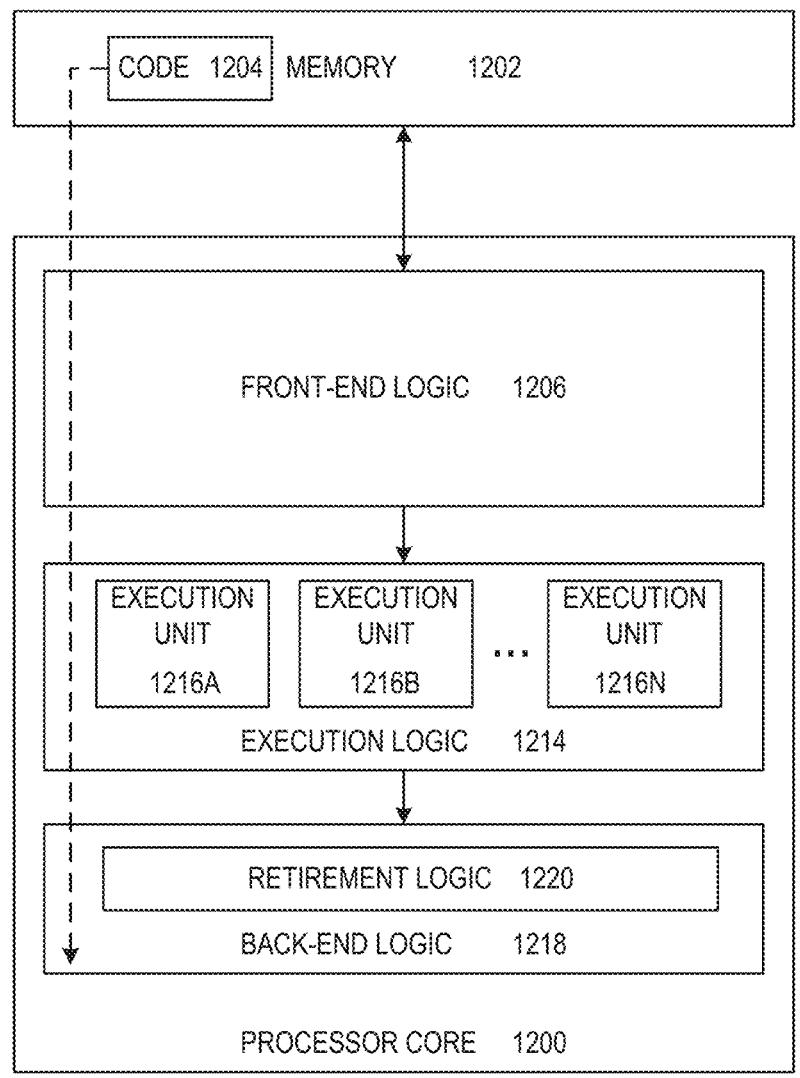
FIGS. 12 and 13 illustrate example computer architectures that can be used in accordance with certain embodiments.
Figure 13:
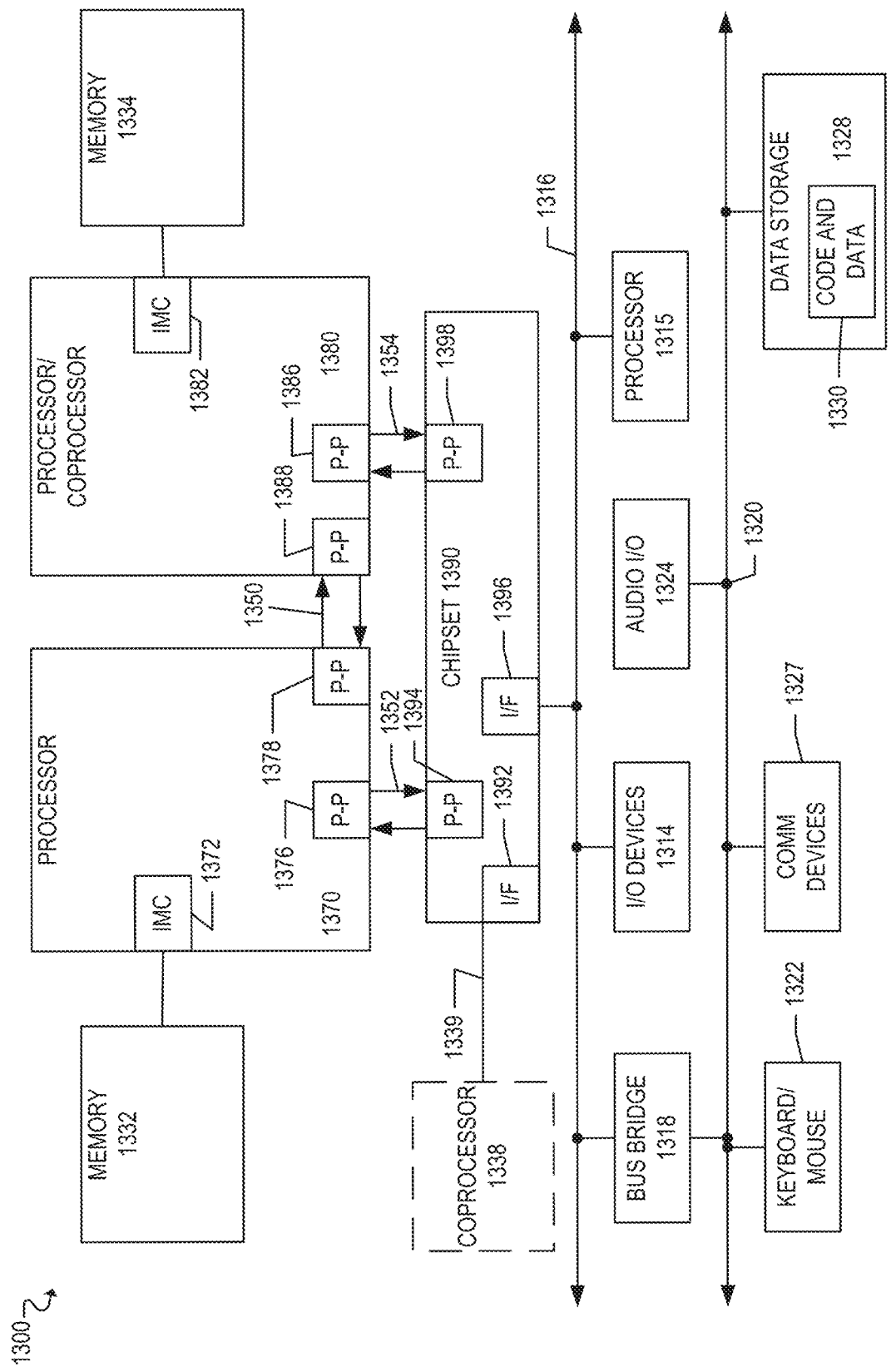

FIGS. 12 and 13 illustrate example computer processor architectures that can be used in accordance with embodiments disclosed herein. For example, in various embodiments, the computer architectures of FIGS. 12 and 13 may be used to implement the visual fog functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 12 illustrates a block diagram for an example embodiment of a processor 1200. Processor 1200 is an example of a type of hardware device that can be used in connection with the embodiments described throughout this disclosure. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 may also include register renaming logic and scheduling logic, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a block diagram for an example embodiment of a multiprocessor 1300. As shown in FIG. 13, multiprocessor system 1300 is a point-to-point interconnect system, and includes a first processor 1370 and a second processor 1380 coupled via a point-to-point interconnect 1350. In some embodiments, each of processors 1370 and 1380 may be some version of processor 1200 of FIG. 12.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of this disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

All or part of any component of FIG. 13 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a communication interface to communicate with a plurality of cameras; and a processor to: obtain metadata associated with an initial state of an object, wherein the object is captured by a first camera of the plurality of cameras in a first video stream at a first point in time, and wherein the metadata is obtained based on the first video stream; predict, based on the metadata, a future state of the object at a second point in time; identify a second camera for capturing the object at the second point in time, wherein the second camera is identified from the plurality of cameras based on: the future state of the object; and a plurality of camera views of the plurality of cameras; and configure the second camera to capture the object in a second video stream at the second point in time, wherein the second camera is configured to capture the object based on the future state of the object.

In one example embodiment of an apparatus, the metadata associated with the initial state of the object comprises an indication of: a current location of the object; and a current direction of travel of the object.

In one example embodiment of an apparatus, the metadata associated with the initial state of the object comprises an indication of one or more current behavioral characteristics of the object.

In one example embodiment of an apparatus, the metadata associated with the initial state of the object comprises an indication of one or more physical characteristics of the object.

In one example embodiment of an apparatus, the processor to predict, based on the metadata, the future state of the object at the second point in time is further to apply a machine learning model to the metadata, wherein the machine learning model is trained to predict the future state of the object based on the initial state of the object.

In one example embodiment of an apparatus, the processor is further to: determine an actual state of the object at the second point in time, wherein the actual state of the object is determined based on one or more video streams captured by the plurality of cameras at the second point in time; and optimize the machine learning model to learn a correlation between the actual state of the object and the metadata associated with the initial state of the object.

In one example embodiment of an apparatus, the processor to configure the second camera to capture the object in the second video stream at the second point in time is further to adjust one or more settings of the second camera to capture the object based on the future state of the object.

In one example embodiment of an apparatus: the future state of the object comprises an indication of a future location of the object at the second point in time; and the processor to identify the second camera for capturing the object at the second point in time is further to determine that the future location of the object is within a camera view of the second camera.

In one example embodiment of an apparatus, the processor is further to: access the second video stream captured by the second camera at the second point in time; detect the object in the second video stream based on the metadata associated with the initial state of the object; and track the object in the first video stream and the second video stream.

In one example embodiment of an apparatus, the processor is further to: access the first video stream captured by the first camera; determine that the object cannot be identified based on the first video stream; determine, based on the future state of the object, that the object can be identified based on the second video stream that is to be captured by the second camera at the second point in time; access the second video stream captured by the second camera at the second point in time; and identify the object based on the second video stream.

In one example embodiment of an apparatus: the object is a person; and the processor to identify the object based on the second video stream is further to identify the person using facial recognition.

In one example embodiment of an apparatus: the object is a car; and the processor to identify the object based on the second video stream is further to: identify a license plate number of the car; or identify one or more physical characteristics of the car.

One or more embodiments may include a system, comprising: a plurality of cameras to capture a plurality of video streams; and one or more processing devices to: access a first video stream captured by a first camera of the plurality of cameras at a first point in time; detect an object in the first video stream; generate metadata associated with an initial state of the object, wherein the metadata is generated based on the first video stream; predict, based on the metadata, a future state of the object at a second point in time; identify a second camera for capturing the object at the second point in time, wherein the second camera is identified from the plurality of cameras based on: the future state of the object; and a plurality of camera views of the plurality of cameras; and configure the second camera to capture the object in a second video stream at the second point in time, wherein the second camera is configured to capture the object based on the future state of the object.

In one example embodiment of a system: the first camera comprises a depth sensor to determine a depth of the object relative to the first camera; and the one or more processing devices to generate metadata associated with the initial state of the object are further to: determine a current location of the object based on the depth of the object relative to the first camera; and determine a current direction of travel of the object.

In one example embodiment of a system, the one or more processing devices to predict, based on the metadata, the future state of the object at the second point in time are further to apply a machine learning model to the metadata, wherein the machine learning model is trained to predict the future state of the object based on the initial state of the object.

In one example embodiment of a system, the one or more processing devices are further to: determine an actual state of the object at the second point in time, wherein the actual state of the object is determined based on one or more video streams captured by the plurality of cameras at the second point in time; and optimize the machine learning model to learn a correlation between the actual state of the object and the metadata associated with the initial state of the object.

In one example embodiment of a system: the future state of the object comprises an indication of a future location of the object at the second point in time; and the one or more processing devices to identify the second camera for capturing the object at the second point in time are further to determine that the future location of the object is within a camera view of the second camera.

In one example embodiment of a system, the one or more processing devices are further to: access the second video stream captured by the second camera at the second point in time; detect the object in the second video stream based on the metadata associated with the initial state of the object; and track the object in the first video stream and the second video stream.

In one example embodiment of a system, the one or more processing devices are further to: determine that the object cannot be identified based on the first video stream; determine, based on the future state of the object, that the object can be identified based on the second video stream that is to be captured by the second camera at the second point in time; access the second video stream captured by the second camera at the second point in time; and identify the object based on the second video stream.

One or more embodiments may include at least one machine accessible storage medium having instructions stored thereon, wherein the instructions, when executed on a machine, cause the machine to: obtain metadata associated with an initial state of an object, wherein the object is captured by a first camera of a plurality of cameras in a first video stream at a first point in time, and wherein the metadata is obtained based on the first video stream; predict, based on the metadata, a future state of the object at a second point in time; identify a second camera for capturing the object at the second point in time, wherein the second camera is identified from the plurality of cameras based on: the future state of the object; and a plurality of camera views of the plurality of cameras; and configure the second camera to capture the object in a second video stream at the second point in time, wherein the second camera is configured to capture the object based on the future state of the object.

In one example embodiment of a storage medium, the instructions that cause the machine to predict, based on the metadata, the future state of the object at the second point in time further cause the machine to apply a machine learning model to the metadata, wherein the machine learning model is trained to predict the future state of the object based on the initial state of the object.

In one example embodiment of a storage medium, the instructions further cause the machine to: determine an actual state of the object at the second point in time, wherein the actual state of the object is determined based on one or more video streams captured by the plurality of cameras at the second point in time; and optimize the machine learning model to learn a correlation between the actual state of the object and the metadata associated with the initial state of the object.

In one example embodiment of a storage medium, the instructions further cause the machine to: access the second video stream captured by the second camera at the second point in time; detect the object in the second video stream based on the metadata associated with the initial state of the object; and track the object in the first video stream and the second video stream.

In one example embodiment of a storage medium, the instructions further cause the machine to: determine that the object cannot be identified based on the first video stream; determine, based on the future state of the object, that the object can be identified based on the second video stream that is to be captured by the second camera at the second point in time; access the second video stream captured by the second camera at the second point in time; and identify the object based on the second video stream.

One or more embodiments may include a method, comprising: obtaining metadata associated with an initial state of an object, wherein the object is captured by a first camera of a plurality of cameras in a first video stream at a first point in time, and wherein the metadata is obtained based on the first video stream; predicting, based on the metadata, a future state of the object at a second point in time; identifying a second camera for capturing the object at the second point in time, wherein the second camera is identified from the plurality of cameras based on: the future state of the object; and a plurality of camera views of the plurality of cameras; and configuring the second camera to capture the object in a second video stream at the second point in time, wherein the second camera is configured to capture the object based on the future state of the object.

In one example embodiment of a method, predicting, based on the metadata, the future state of the object at the second point in time further comprises applying a machine learning model to the metadata, wherein the machine learning model is trained to predict the future state of the object based on the initial state of the object.

One or more embodiments may include a system, comprising: means for obtaining metadata associated with an initial state of an object, wherein the object is captured by a first camera of a plurality of cameras in a first video stream at a first point in time, and wherein the metadata is obtained based on the first video stream; means for predicting, based on the metadata, a future state of the object at a second point in time; means for identifying a second camera for capturing the object at the second point in time, wherein the second camera is identified from the plurality of cameras based on: the future state of the object; and a plurality of camera views of the plurality of cameras; and means for configuring the second camera to capture the object in a second video stream at the second point in time, wherein the second camera is configured to capture the object based on the future state of the object.

What is claimed is:

1. An apparatus, comprising:
a communication interface to communicate with a plurality of cameras; and
a processor to:
obtain metadata associated with an initial state of an object based on a first video stream captured by a first camera of the plurality of cameras, wherein the object is captured in the first video stream during a first time interval;
determine, based on the metadata, a predicted future state of the object at a future time;
select, from the plurality of cameras, a second camera for capturing the object at the future time, wherein the second camera is selected based on:
the predicted future state of the object; and
a plurality of camera views of the plurality of cameras; and
configure, based on the predicted future state of the object, the second camera to capture the object in a second video stream at the future time.

2. The apparatus of claim 1, wherein the metadata associated with the initial state of the object comprises an indication of:
a current location of the object; and
a current direction of travel of the object.

3. The apparatus of claim 1, wherein the metadata associated with the initial state of the object comprises an indication of one or more current behavioral characteristics of the object.

4. The apparatus of claim 1, wherein the metadata associated with the initial state of the object comprises an indication of one or more physical characteristics of the object.

5. The apparatus of claim 1, wherein the processor to determine, based on the metadata, the predicted future state of the object at the future time is further to apply a machine learning model to the metadata, wherein the machine learning model is trained to determine the predicted future state of the object based on the initial state of the object.

6. The apparatus of claim 5, wherein the processor is further to:
determine an actual state of the object at the future time, wherein the actual state of the object is determined based on one or more video streams captured by the plurality of cameras at the future time; and
optimize the machine learning model to learn a correlation between the actual state of the object and the metadata associated with the initial state of the object.

7. The apparatus of claim 1, wherein the processor to configure, based on the predicted future state of the object, the second camera to capture the object in the second video stream at the future time is further to adjust one or more settings of the second camera to capture the object based on the predicted future state of the object.

8. The apparatus of claim 1, wherein:
the predicted future state of the object comprises an indication of a future location of the object at the future time; and
the processor to select, from the plurality of cameras, the second camera for capturing the object at the future time is further to determine that the future location of the object is within a camera view of the second camera.

9. The apparatus of claim 1, wherein the processor is further to:
access the second video stream captured by the second camera at the future time;
detect the object in the second video stream based on the metadata associated with the initial state of the object; and
track the object in the first video stream and the second video stream.

10. The apparatus of claim 1, wherein the processor is further to:
access the first video stream captured by the first camera;
determine that the object cannot be identified based on the first video stream;
determine, based on the predicted future state of the object, that the object can be identified based on the second video stream that is to be captured by the second camera at the future time;
access the second video stream captured by the second camera at the future time; and
identify the object based on the second video stream.

11. The apparatus of claim 10, wherein:
the object is a person; and
the processor to identify the object based on the second video stream is further to identify the person using facial recognition.

12. The apparatus of claim 10, wherein:
the object is a car; and
the processor to identify the object based on the second video stream is further to:
identify a license plate number of the car; or
identify one or more physical characteristics of the car.

13. A system, comprising:
a plurality of cameras to capture a plurality of video streams; and
one or more processing devices to:
access a first video stream captured by a first camera of the plurality of cameras during a first time interval;
detect an object in the first video stream;
generate metadata associated with an initial state of the object, wherein the metadata is generated based on the first video stream;
determine, based on the metadata, a predicted future state of the object at a future time;
select, from the plurality of cameras, a second camera for capturing the object at the future time, wherein the second camera is selected based on:
the predicted future state of the object; and
a plurality of camera views of the plurality of cameras; and
configure, based on the predicted future state of the object, the second camera to capture the object in a second video stream at the future time.

14. The system of claim 13, wherein:
the first camera comprises a depth sensor to determine a depth of the object relative to the first camera; and
the one or more processing devices to generate metadata associated with the initial state of the object are further to:
determine a current location of the object based on the depth of the object relative to the first camera; and
determine a current direction of travel of the object.

15. The system of claim 13, wherein the one or more processing devices to determine, based on the metadata, the predicted future state of the object at the future time are further to apply a machine learning model to the metadata, wherein the machine learning model is trained to determine the predicted future state of the object based on the initial state of the object.

16. The system of claim 15, wherein the one or more processing devices are further to:
determine an actual state of the object at the future time, wherein the actual state of the object is determined based on one or more video streams captured by the plurality of cameras the future time; and
optimize the machine learning model to learn a correlation between the actual state of the object and the metadata associated with the initial state of the object.

17. The system of claim 13, wherein the one or more processing devices are further to:
access the second video stream captured by the second camera at the future time;
detect the object in the second video stream based on the metadata associated with the initial state of the object; and
track the object in the first video stream and the second video stream.

18. The system of claim 13, wherein the one or more processing devices are further to:

determine that the object cannot be identified based on the first video stream;

determine, based on the predicted future state of the object, that the object can be identified based on the second video stream that is to be captured by the second camera at the future time;

access the second video stream captured by the second camera at the future time; and identify the object based on the second video stream.

19. At least one non-transitory machine accessible storage medium having instructions stored thereon, wherein the instructions, when executed on a machine, cause the machine to:

obtain metadata associated with an initial state of an object based on a first video stream captured by a first camera of a plurality of cameras, wherein the object is captured in the first video stream during a first time interval;

determine, based on the metadata, a predicted future state of the object at a future time;

select, from the plurality of cameras, a second camera for capturing the object at the future time, wherein the second camera is selected based on:
the predicted future state of the object; and
a plurality of camera views of the plurality of cameras; and configure, based on the predicted future state of the object, the second camera to capture the object in a second video stream at the future time.

20. The storage medium of claim 19, wherein the instructions that cause the machine to determine, based on the metadata, the predicted future state of the object at the future time further cause the machine to apply a machine learning model to the metadata, wherein the machine learning model is trained to determine the predicted future state of the object based on the initial state of the object.

21. The storage medium of claim 20, wherein the instructions further cause the machine to:

determine an actual state of the object at the future time, wherein the actual state of the object is determined based on one or more video streams captured by the plurality of cameras at the future time; and optimize the machine learning model to learn a correlation between the actual state of the object and the metadata associated with the initial state of the object.

22. The storage medium of claim 19, wherein the instructions further cause the machine to:

access the second video stream captured by the second camera at the future time;

detect the object in the second video stream based on the metadata associated with the initial state of the object; and track the object in the first video stream and the second video stream.

23. The storage medium of claim 19, wherein the instructions further cause the machine to:

determine that the object cannot be identified based on the first video stream;

determine, based on the predicted future state of the object, that the object can be identified based on the second video stream that is to be captured by the second camera at the future time;

access the second video stream captured by the second camera at the future time; and identify the object based on the second video stream.

24. A method, comprising:

obtaining metadata associated with an initial state of an object based on a first video stream captured by a first camera of a plurality of cameras, wherein the object is captured in the first video stream during a first time interval;

determining, based on the metadata, a predicted future state of the object at a future time;

selecting, from the plurality of cameras, a second camera for capturing the object at the future time, wherein the second camera is selected based on:
the predicted future state of the object; and
a plurality of camera views of the plurality of cameras; and configuring, based on the predicted future state of the object, the second camera to capture the object in a second video stream at the future time.

25. The method of claim 24, wherein determining, based on the metadata, the predicted future state of the object at the future time is further to apply a machine learning model to the metadata, wherein the machine learning model is trained to determine the predicted future state of the object based on the initial state of the object.

* * * * *